United States Patent [19]

Malone

[11] Patent Number: 4,863,239
[45] Date of Patent: Sep. 5, 1989

[54] MIRRORED GLOVE

[76] Inventor: Robert Malone, P.O. Box 1115, Willow, Ak. 99688

[21] Appl. No.: 66,695

[22] Filed: Jun. 25, 1987

[51] Int. Cl.[4] .............................................. G02B 5/12
[52] U.S. Cl. .......................................... 350/98; 2/160
[58] Field of Search ................. 350/98, 97; 2/159, 160

[56] References Cited

U.S. PATENT DOCUMENTS

| | | | |
|---|---|---|---|
| 1,513,237 | 10/1924 | Green | 350/98 |
| 1,535,105 | 4/1925 | Cota | 350/98 |
| 1,966,822 | 7/1934 | Lieb | 350/98 |
| 3,700,836 | 10/1972 | Rackson | 2/159 |

FOREIGN PATENT DOCUMENTS 534190 12/1956 Canada .................................. 350/98

*Primary Examiner*—Bruce Y. Arnold
*Assistant Examiner*—Loha Ben
*Attorney, Agent, or Firm*—Garrison & Stratton

[57] ABSTRACT

This invention relates to the technical field of portable hand-carried rear-view safety mirrors and more especially to a rear-view mirror adapted for use upon the back portion of a glove. The device combines the safety features of a rear-view mirror with the manipulative and traditional features of a worn glove.

17 Claims, 2 Drawing Sheets

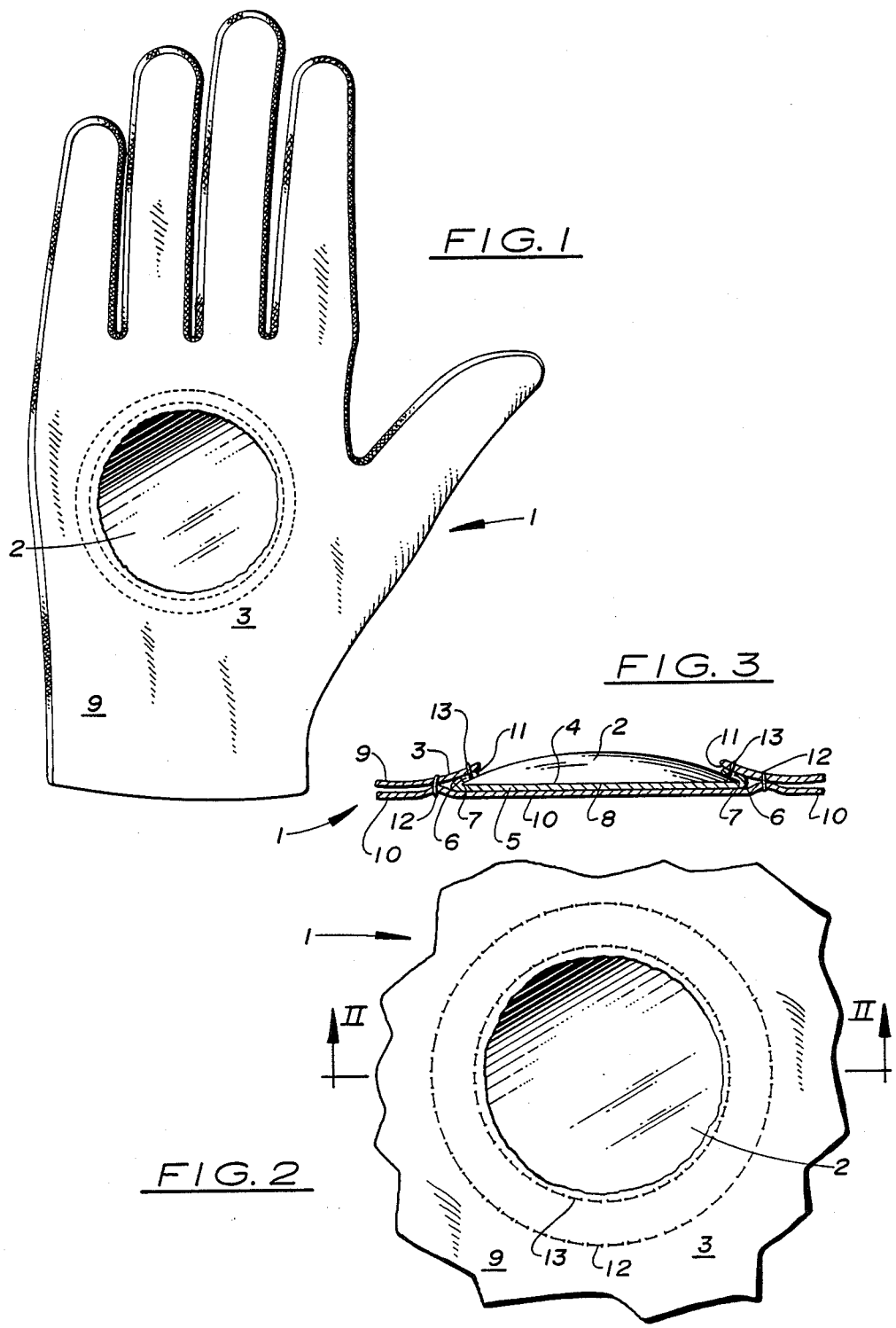

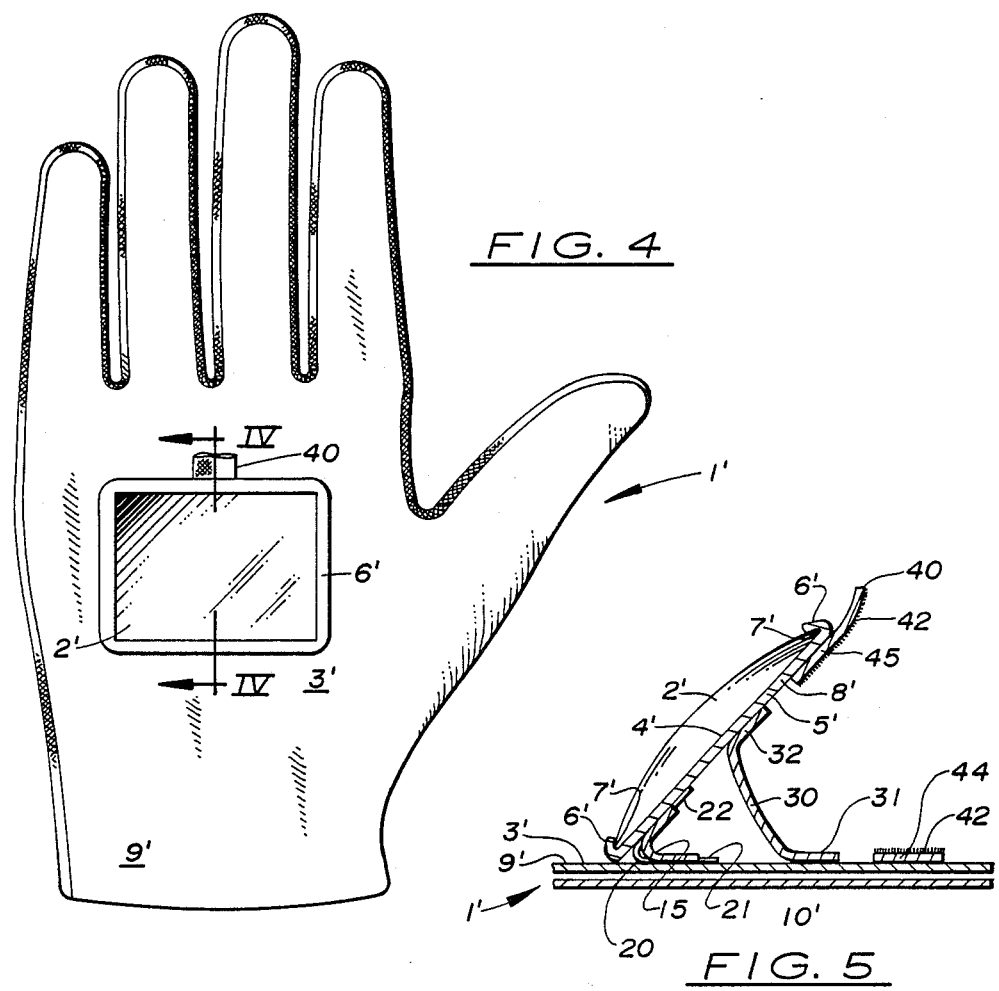
FIG. 4
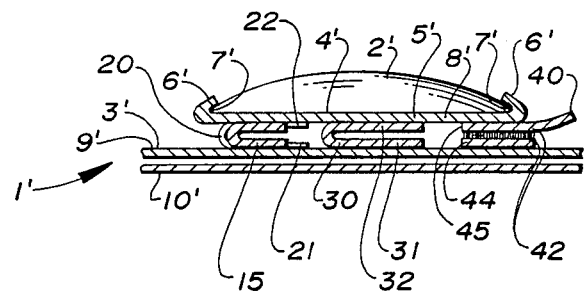
FIG. 5
FIG. 6

MIRRORED GLOVE

TECHNICAL FIELD

This invention relates to the technical field of portable hand-carried rear-view safety mirrors and more especially to a rear-view mirror adapted for use upon the back portion of a glove. Rear-view safety mirrors are important apparatus used to warn the operator or riders of a vehicle of rearward dangers.

BACKGROUND OF THE INVENTION

In the operation of vehicles in which the operator or rider sits upon an exposed seat, usually astride the vehicle, the use of rear-view mirrors is an important safety precaution. Due to the typically small size of such vehicles they are particularly susceptible to being struck or sideswiped from other vehicles approaching and overtaking them from the rear. Another danger arises when the rider is startled by a passing vehicle of whose presence the rider was not previously aware. Mirrors have been attached to these vehicles in an effort to warn riders of such rearward dangers. These mirrors, however, are frequently ineffective due to the excessive vibrations transmitted to them through their mirror mounts. In addition, a clear rearward view is often obstructed because the mirror is angled in an ineffective direction. The need for a means to see to the rear without turning around is particularly pronounced for bicyclists and snowmobile riders.

In the Applicant's search for prior art, only four patents were found that used the concept of attaching a safety reflective apparatus to a glove which could be worn by the rider. Lieb (U.S. Pat. No. 1,966,822) and Green (U.S. Pat. No. 1,513,237) use reflectors on gloves which can be seen by following or passing drivers. Frank (U.S. Pat. No. 468,149) and Rice (U.S. Pat. No. 1,612,055) use gloves with mirrors which are normally concealed by an opaque protective covering. The protective coverings may be removed to enable the wearer to look at himself or herself. Although the prior art does reveal various rear-view mirrors which may be mounted on hats, the concept of using a rear-view mirror on a glove was not found.

OBJECTIVES OF THE INVENTION

It is the general objective of the present invention to provide an apparatus whereby the user may view rearward dangers when desired, without turning his body or head around.

It is another general objective to provide a rear-view mirror mounting which is less susceptible to the vibrations of the vehicle.

Another objective of the present invention is to provide a rear-view mirror which is easily manipulated and capable of being instantly redirected at the desire of the user.

Another objective is to provide a rear-view mirror which will not obstruct the user's view.

Another objective is to provide a rear-view mirror which may be easily carried and stored.

Another objective is to provide a glove which serves its ordinary purpose without any inconvenience to the wearer.

Another objective is to provide an apparatus which is simple in its construction and arrangement, strong, durable, compact, efficient in its use, readily constructed and inexpensive to manufacture.

DISCLOSURE OF THE INVENTION

The present invention overcomes the previously mentioned disadvantages of the prior art while achieving the described general and specific objectives.

The concept combines the safety features of a rear-view mirror with the manipulative and traditional features of a worn glove. In the invention, a mirror is attached to the outermost shell of a glove. The invention contemplates the use of an adjustable, removable or permanently attached flat or convex mirror structure of a relatively small diameter or small rectangular shape. The mirror is attached to the relatively flat part of the back portion of the glove's outermost shell which covers the back of the hand. The mirror can be attached to the glove by any of the conventional methods, such as with a fabric hook and loop structure similar to the structures sold under the Velcro trademark, adhesive tape or glue, heat-melt glue, by sewing the mirror onto or contained within the glove, or by using any combination of these methods. The mirror may be mounted upon the glove's outermost shell itself, or, as in the preferred embodiment, the mirror may be mounted between the glove's inner lining and outermost shell. The mirror may also be attached to the glove's outermost shell in a manner that permits the mirror to be positioned at an inclined angle with respect to the back portion of the hand. The most essential feature of the invention is that the mirror be able to reflect the desired view to the wearer.

By moving or rotating his wrist or hand to bring into focus the desired rear view, the wearer may quickly and easily direct the rear-view mirror to any desired angle or direction without having to turn his body or head around. Due to the shock absorbent features of the human hand, wrist and arm, the device is less susceptible to the vibrations of the vehicle. The device is easily manipulated and is capable of being instantly redirected at the desire of the wearer. Unlike mirrors which are attached to the vehicle or to a hat or helmet, the present device does not further obstruct the wearer's forward or side views. Because of the compact size of this device, it is easily carried and stored. The glove also serves its ordinary purpose without any inconvenience to the wearer. This device is simple in its construction and arrangement, strong, durable, compact, efficient to use, readily constructed and inexpensive to manufacture.

BRIEF DESCRIPTION OF THE DRAWINGS

FIG. 1 is a plan view of the outermost back portion of a mirrored glove made in accordance with this invention.

FIG. 2 is a partial plan view of the preferred embodiment of the present invention as shown in FIG. 1.

FIG. 3 is a side elevational view partly in cross section of the preferred embodiment as shown in FIG. 2 at the plane defined by line II—II.

FIG. 4 is a plan view of the outermost back portion of another embodiment of a mirrored glove made in accordance with this invention with the mirror being in a closed position.

FIG. 5 is a side elevational view partly in cross section of the embodiment as shown in FIG. 4 at the plane defined by line IV—IV with the mirror being in an open position.

FIG. 6 is a side elevational view partly in cross section of the embodiment as shown in FIG. 4 at the plane defined by line IV—IV with the mirror being in a closed position.

BEST MODE OF CARRYING OUT THE INVENTION

Referring to FIGS. 1–3, wherein like numerals indicate like parts, a mirror 2 is secured to the back portion 3 of the outermost shell 9 of a glove 1. The glove 1 is composed of any suitable flexible material used for such purposes, such as soft leather or fabric. Any convenient mirror material could be used with this invention, however, the safety of the device would be increased if shock and impact absorbent glass or plastic is used.

This invention may be used with any form or design of glove 1. The type of glove 1 used is dependent upon the sport or activities being undertaken. For example, a light glove is usually used for bicycling and a heavier glove is usually used for riding a snowmobile. This invention may also be used with gloves wherein the finger or thumb portions are removed as are often found in bicycling gloves. The mirror 2 may be either flat or convex and may be of any desirable shape. In the preferred embodiment shown in FIGS. 1–3, the mirror 2 has a convex circular shape and a two inch diameter. The convex circular shape allows the user to view a larger area than would be otherwise available with a planar surfaced mirror and partially compensates for any slight movement of the wearer's hand during the course of viewing the reflection in the mirror 2. The circular shape alleviates the possibility that a corner of the mirror 2 could break-off and harm the wearer, or that the wearer could impact the corner of the mirror 2 against himself or another object. The mirror 2' may also have a generally rectangular shape as shown in FIGS. 4–6. The rectangular shape is quite convenient to use if the mirror 2' will be tilted at an angle on the back portion 3 of the glove 1.

The mirror 2 is positioned at any convenient location on the relatively flat part of the glove outermost shell back portion 3, which covers the back of the hand, with the reflecting surface 4 uncovered and readily viewable to the wearer. The exact position of the mirror 2 would depend upon the size and shape of the mirror 2 and glove 1 used. In the preferred embodiment, the mirror 2 is placed in the center of the back portion 3 of the glove's 1 outermost shell 9.

There are many methods of manufacturing which could be used to mount the mirror 2 upon the glove 1. The mirror 2 may first be mounted within a supporting frame 5 which has an upper lip 6, a groove 7 and a base support 8 in which the mirror 2 is placed. The mirror 2, or supporting frame 5 if used, could be secured to the glove 1 by means of double-sided adhesive tape, adhesive, heat-melt glue, or by being integrally sewn onto or within the glove 1.

In the preferred embodiment as shown in FIGS. 1–3, the mirror 2 is secured to the glove 1 by first removing a first portion of the glove's 1 outermost shell 9 at the mirror's 2 desired location, thereby forming an opening. The glove 1 may be initially constructed with the opening already at the desired location. The dimensions of the mirror 2 should be suitably larger than the corresponding dimensions of the opening. The mirror 2 is inserted between the remaining back portion 3 of the glove's 1 outermost shell 9 and the inner lining 10 of the glove 1 such that the reflective surface 4 of the mirror 2 faces outwardly through the opening caused by the previous step. The mirror 2 may then be glued to the interior surfaces 11 of the glove's 1 outermost shell 9. Alternatively, the outermost shell 9 and inner lining 10 of the glove 1 may be sewn together with thread 12 thereby securing the mirror 2 between the outermost shell 9 and inner lining 10 at the desired location. A supporting thread 13 may be sewn into the peripheral area surrounding the opening on the glove's 1 outermost shell 9. The supporting thread may then be cinched tight to further secure the enclosed but visible mirror's 2 reflecting surface 4 and to prevent tearing of the glove 1 about such opening.

An alternative embodiment of the present invention is illustrated in FIGS. 4–6, wherein a generally rectangular mirror 2' is secured to the outermost shell 9' in a manner permitting the mirror 2' to be positioned at an angle to the back portion 3' of the glove 1'. This may be achieved by securing the mirror to the first leg of a hinge 15. The second leg of the hinge 15 is secured to the outermost shell 9' of the back portion 3' of the glove 1'. The hinge 15 pivotally secures the mirror 2' to the glove 1' so that the reflective surface 4' of the mirror 2' is appropriately positioned.

The positioning and angling of the mirror 2' is determined by the direction of the desired reflected view. Usually the mirror 2' would have an angle wherein the mirror's edge closest to the knuckle position on the glove 1' would be inclined from the pivotal portion of the hinge 15. A spring 20 having a first leg 21 and a second leg 22 may be used to urge the mirror 2' to pivot at the hinge 15 from a closed position to an open position. The first leg 21 is urged against the back portion 3' of the outermost shell 9'. The second leg 22 is urged against the back of the mirror 2'. If the mirror 2' is first mounted within a supporting frame 5' which has an upper lip 6', a groove 7' and a base support 8', in which the mirror 2 is placed, the second leg 22 may be urged against the base support 8'. The spring 20 may be held in place by being secured to the outermost shell 9' of the glove 1', to the mirror 2', or to the mirror's supporting frame 5'. A brace 30 having a first end 31 and a second end 32 may be used to limit the angle of inclination of the mirror 2' while in the open position. The first end 31 is secured to the outermost shell 9' of the glove 1'. The second end 32 is secured to the back of the mirror 2' or to the back of the mirror's supporting frame 5'. The brace 30 also gives support to the mirror 2' during use. The first end 31, first leg 21, and second leg of the hinge 15 may also be sewn to the outermost shell 9' and inner lining 10' of the glove 1'.

In this alternative embodiment, a means to secure the mirror 2' in the closed position may also be provided. In the closed position, the close proximity of the mirror to the back of the glove imparts a torque to the spring 20. There are various methods by which the mirror 2' may be secured in the closed position. The Applicant prefers to use a fabric hook and loop fastener 42 similar to the product sold under the Velcro trademark as the means to secure the mirror 2' in the closed position. The fabric hook and loop fastener 42 has a first part 44 and a second part 45. The first part 44 is secured to the back portion 3' of the outermost shell 9' of the glove 1'. The second part 45 is secured to the back of the mirror 2' or to the back of the mirror's base support 8'. In the closed position, the first part 44 contacts and fastens itself to the second part 45 of the hook and loop fastener 42. The second part 45 may also extend past the edges of the mirror 2' and base support 8' to provide a pull tab 40 to easily open and close the device. The mirror 2' may also be used in a permanently inclined position.

INDUSTRIAL APPLICABILITY

The industrial applicability of this invention can be readily ascertained by reference to the following example of its use.

This invention may be used by riders or operators of vehicles in which a view to the rear is necessary and a hand-held rear-view mirror device is desired. This invention is particularly adapted for riders of vehicles in which the operator or rider sits upon an exposed seat, usually astride the vehicle such as with a bicycle or a snowmobile. The user of this invention would wear the glove in the conventional manner. While so worn, the device rides safely and comfortably on the hand of the wearer. When a view to the rear is desired, the wearer may move or rotate the wearer's wrist or hand to bring into focus the desired reflection of the view to the rear. The mirror does not experience the vibrations commonly associated with a stationary mirror, and the present invention does not further obstruct the wearer's view. The device is compact and easily carried and stored. In addition, the glove serves its ordinary purpose without any inconvenience to the wearer. The device is readily constructed, inexpensive to manufacture, strong, durable, compact, and efficient to use.

In the alternative embodiment the user pulls on the pull tab to unlock the means of securing the mirror in a closed position. The torsion in the spring urges the spring to open and maintain the mirror in an open position. The brace limits the opening of the mirror and determines the open position of the mirror. The brace also gives support to the mirror while the mirror is in the open position. The user then moves or rotates the wrist or hand to bring into focus a reflection of the desired view. The device may be closed by pressing the mirror toward the back of the glove until the means to secure the mirror in the closed position is engaged.

I claim:
1. A mirrored glove comprising:
   (a) a glove having an outermost shell, said outermost shell having a back portion; and
   (b) a mirror secured to said back portion of said outermost shell for reflecting a rearview image to said user, said mirror being uncovered and positioned at an angle to said back portion.
2. A mirrored glove as defined in claim 1, further comprising a supporting frame, said supporting frame comprising an upper lip, a groove, and a base support, said supporting frame giving structural support to said mirror, said mirror being positioned upon said base support between said upper lip and said base support in said groove.
3. A mirrored glove as defined in claim 1, wherein said mirror is a convex mirror.
4. A mirrored glove as defined in claim 1, wherein said mirror is secured with an adhesive to said back portion of said outermost shell.
5. A mirrored glove as defined in claim 1, wherein said mirror has approximately a rectangular shape.
6. A mirrored glove as defined in claim 1, wherein said angle is an acute angle.
7. A mirrored glove as defined in claim 1, further comprising:
   (a) a hinge, said hinge pivotally securing said mirror to said back portion of said outermost shell;
   (b) a spring, said spring having a first leg and a second leg, said first leg being urged against said back portion of said outermost shell, said second leg being urged against said mirror, said spring urging said mirror to pivot at said hinge to an open position;
   (c) a brace, said brace having a first end and a second end, said first end being secured to said back portion of said outermost shell, said second end being secured to said mirror, said brace limiting said angle that said mirror is able to pivot at said hinge; and
   (d) a means to secure said mirror in a closed position, said mirror and said back portion of said outermost shell imparting a torque to said spring when said mirror is in said closed position.
8. A mirrored glove as defined in claim 7, wherein said means to secure said mirror in a closed position comprises a fabric hook and loop fastener, said fabric hook and loop fastener having a first part and a second part, said first part being secured to said back portion of said outermost shell, said second part being secured to said mirror, said second part further comprising a pull tab, said closed position being achieved when said first part of said fabric hook and loop fastener engages said second part of said fabric hook and loop fastener.
9. A mirrored glove as defined in claim 1, further comprising:
   (a) a hinge, said hinge pivotally securing said mirror to said back portion of said outermost shell;
   (b) a spring attached to said glove, said spring urging said mirror to pivot away from said back portion of said outermost shell; and
   (c) a means to secure said mirror in a closed position, said mirror and said back portion of said outermost shell imparting a torque to said spring when said mirror is in said closed position.
10. A mirrored glove as defined in claim 9, wherein said spring having a first leg and a second leg, said first leg being urged against said back portion of said outermost shell, said second leg being urged against said mirror, said spring urging said mirror to pivot at said hinge to an open position.
11. A mirrored glove as defined in claim 9, further comprising a brace, said brace having a first end and a second end, said first end being secured to said back portion of said outermost shell, said second end being secured to said mirror, said brace limiting said angle that said mirror is able to pivot at said hinge.
12. A mirrored glove as defined in claim 9, further comprising:
   (a) a spring, said spring having a first leg and a second leg, said first leg being urged against said back portion of said outermost shell, said second leg being urged against said mirror, said spring urging said mirror to pivot at said hinge to an open position; and
   (b) a brace, said brace having a first end and a second end, said first end being secured to said back portion of said outermost shell, said second end being secured to said mirror, said brace limiting said angle that said mirror is able to pivot at said hinge.
13. A mirrored glove for reflecting a rear view to a user comprising:
   (a) a glove having an outermost shell, said outermost shell having a back portion, said outermost shell having an interior surface, said glove having an opening in said back portion of said outermost shell, said glove having an inner lining; and (b) a mirror for reflecting a desired rearward view to said user, said mirror being suitably larger than said opening, said mirror being interposed between said outermost shell and said inner lining, said mirror being position below said opening, said mirror being secured to said interior surface of said outermost shell, said mirror being uncovered.

14. A mirrored glove as defined in claim 13, wherein said mirror is secured to said interior surface of said outermost shell by sewing together said inner lining and said outermost shell about said mirror.

15. A mirrored glove as defined in claim 13, further comprising a supporting frame, said supporting frame comprising an upper lip, a groove, and a base support, said supporting frame giving structural support to said mirror, said mirror being positioned upon said base support between said upper lip and said base support in said groove.

16. A mirrored glove as defined in claim 13, wherein said mirror is a convex mirror.

17. A mirrored glove as defined in claim 13, wherein said mirror is secured with an adhesive to said interior surface of said outermost shell.

* * * * *